Nov. 15, 1955
T. H. HOLTHOUSE ET AL
2,723,611
APPARATUS FOR THINNING PLANTS
Filed Oct. 29, 1951
2 Sheets-Sheet 1
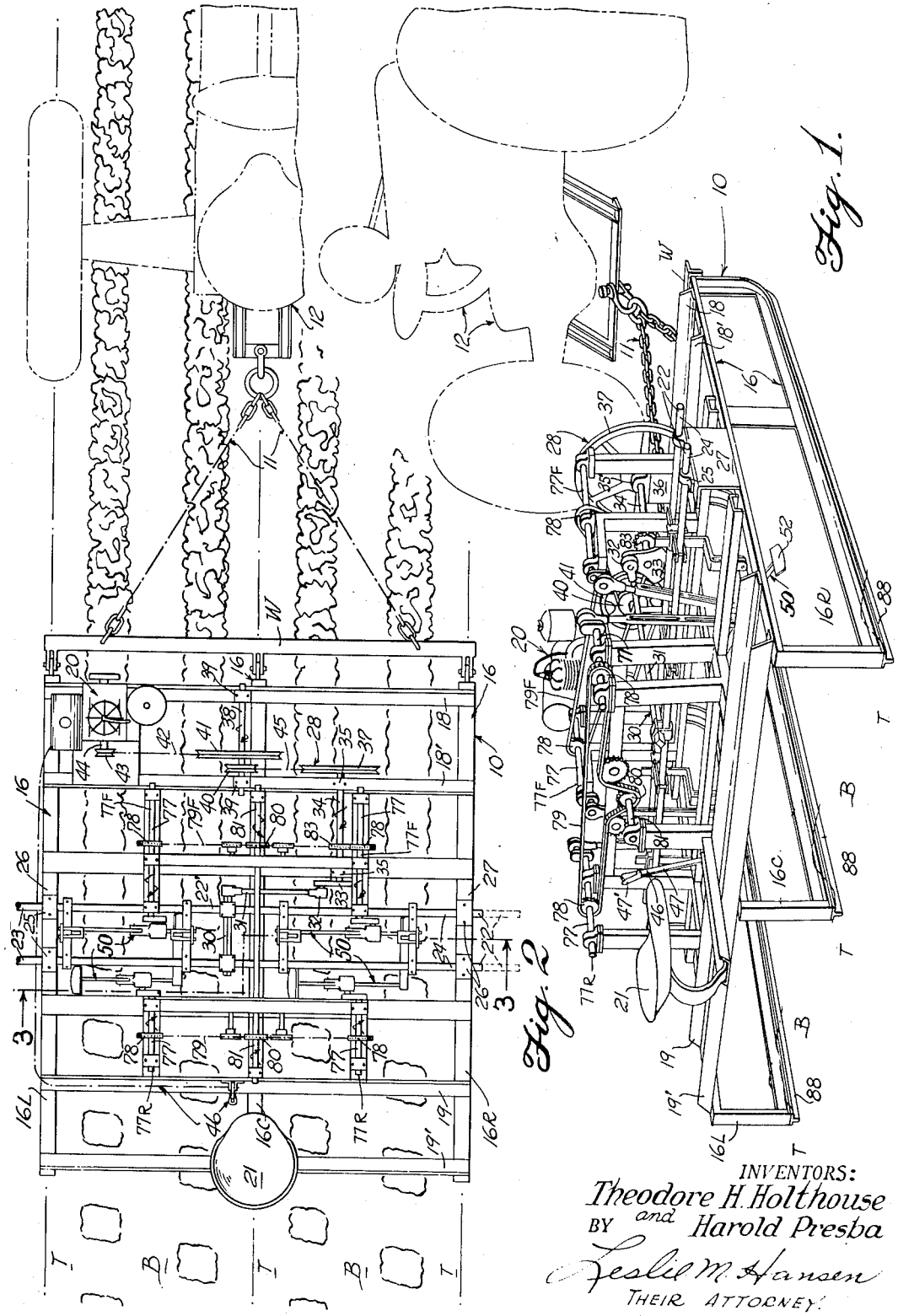
INVENTORS:
Theodore H. Holthouse
and Harold Presba
BY
Leslie M. Hansen
THEIR ATTORNEY

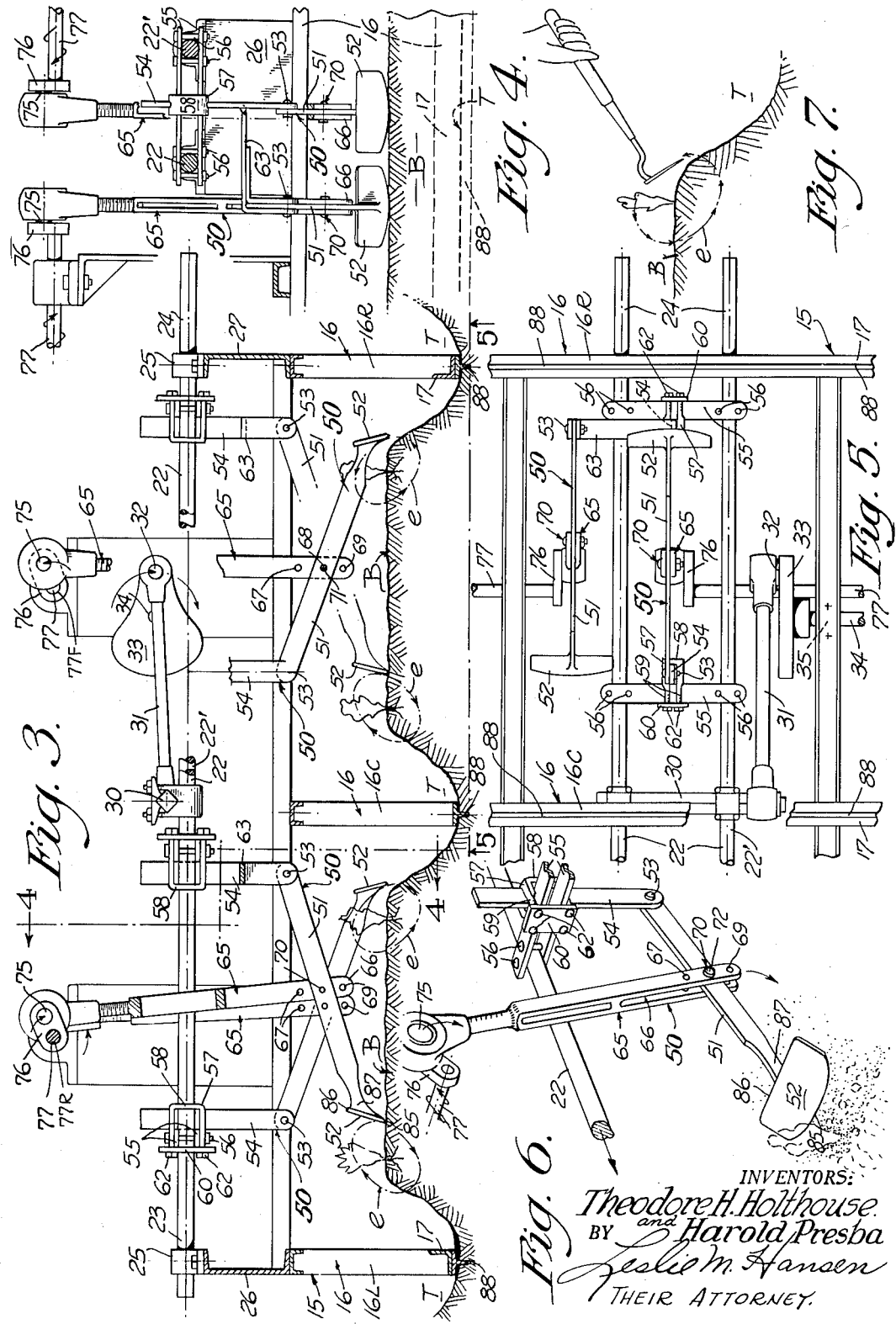

United States Patent Office 2,723,611
Patented Nov. 15, 1955

2,723,611

APPARATUS FOR THINNING PLANTS

Theodore H. Holthouse and Harold Presba,
Hollister, Calif.

Application October 29, 1951, Serial No. 253,598

4 Claims. (Cl. 97—13)

This invention relates to plant thinning machinery and more particularly to an improved apparatus for thinning row crops in a manner closely simulating manual hoe action.

The art relating to plant thinning equipment is replete with devices for chopping, blocking or otherwise removing plants from a row thereof to leave plants at spaced intervals. While accomplishing plant thinning, prior known devices are objectionable due to the harsh and ungentle manner in which the chopping and/or blocking is done. In most cases these prior known devices throw dirt into the air and to all sides of the equipment and over the plants that remain. Moreover, they raise dust and otherwise fail to leave the field in a clean condition as would otherwise occur under hand operation, thus necessitating further labor in cleaning up after thinning of plants.

The present invention contemplates mechanical thinning of plants in a manner so closely simulating the man with the hoe as to raise a minimum of dust and dirt thereby leaving the remaining plants uncovered and clean for undisturbed growth.

Another object of this invention is to provide plant thinning apparatus which is relatively stable, although movable along the earth surface, so as to assure uniform and accurate thinning of plants in the rows thereof.

It is another object to provide in a plant thinning hoe mechanism for positively reciprocating the hoe transversely of a row of crops simultaneously with advancement of the hoe along such row. In connection with the foregoing object it is a further object to provide mechanism operated in timed relation with the reciprocating mechanism for positively dipping the hoe into earth on the thrust stroke of the hoe and for raising the hoe over the row crop on the return stroke of the hoe.

These and other objects and advantages of the present invention will become apparent in the following description in view of the drawings, in which:

Fig. 1 is a perspective view of the plant thinning apparatus of the present invention.

Fig. 2 is a top plan view of the apparatus as seen in Fig. 1.

Fig. 3 is an enlarged cross section of Fig. 2 taken substantially along line 3—3 thereof.

Fig. 4 is a vertical section of Fig. 3 taken along line 4—4 thereof.

Fig. 5 is a fragmentary bottom plan view looking upwardly substantially along line 5—5 in Fig. 3.

Fig. 6 is a partial perspective of one hoe unit of the present invention.

Fig. 7 is a diagram illustrating the action of a manually operated hoe for comparison with the hoe action of this invention as seen in Fig. 3.

As illustrated in Figs. 1 and 2, apparatus embodying the present invention generally designated 10, is adapted to be connected by draw bar or chain 11 to a tractor 12 for movement thereby over the row crops to be thinned. While the apparatus 10 is suitable for operation on seedlings of any kind or species, for purposes of the present disclosure it is shown in conjunction with crops planted two rows to a bed or double beds as best illustrated in Figs. 2 and 3. Many kinds of row crops are thus planted and in particular sugar beets are usually arranged in what is known as double beds in the manner as shown in Fig. 3. However, some growers prefer single bed planting, i. e. a single row of plants to each bed. The present invention is suitable for use on either double or single bed planting. In either event, it is a matter of positioning the hoe over each row for transverse orbital movement relative to the plants therein.

Fig. 3 shows the contour of earth when prepared for double bed planting. In this case each bed B is divided from adjacent beds by a trench T. The rows of trenches T are thus spaced for standard gauge tractors, cultivators and the like as well as for uniform irrigation of each row of plants in the several beds. Accordingly, the apparatus 10 comprises a frame 15 having traction supports or skids 16 spaced to conform to the spacing of trenches T. These traction supports or skids for purposes of the present invention, are provided with runners 17 by which the frame 15 is adapted to glide over the earth.

The frame 15 illustrated is constructed to span two double rows of crops and therefore is provided with left and right side traction supports or skids 16L and 16R, as well as a center skid 16C of similar construction. Referring to Figs. 1 and 2 it will be noted that the skids 16L, 16C and 16R are joined by transverse angle irons 18—18' and 19—19' at their fore and aft ends, respectively, along their upper edges. The fore angle irons 18—18' serve to support a self contained source of power 20 in the form of an internal combustion engine. The aft angle irons serve to support a seat 21 centrally of the frame in a manner well known in the art. The fore end of each skid 16 is connected to a whipple tree W which in turn is connected to the chain 11 coupled to the tractor 12.

Midway between the fore and aft angle irons 18—18' and 19—19' are a pair of reciprocating rods 22. These rods 22 extend transversely of the frame 15 and have their left and right end portions 23—24, respectively, guided in bearing bosses 25 supported on upstanding pedestals 26 and 27 secured to the left and right side skids or supports 16L and 16R, respectively. Moreover, as best seen in Fig. 3, the rods 22 are sufficiently longer than the overall width of the frame 15 to assure support of the rods in their bearings 25 during reciprocation of the rods crosswise the frame.

The rods 22 are positively reciprocated by power created at the source of power 20 and through drive mechanism 28 now to be explained. As best seen in Figs. 2 and 5 the rods 22 are spaced from each other in a fore and aft direction on the frame 15. The fore rod 22' has a block 30 suitably secured to its mid portion for pivotal connection to a pitman rod 31, see also Fig. 3. The opposite end of rod 31 is pivotally connected as at 32 to an eccentric 33 drivingly secured to a shaft 34 suitably journaled in bearings 35—35' supported at proper elevation on blocks 36 secured to the frame 15. The shaft 34 extends parallel to the fore to aft axis of the frame and has a sheave 37 secured to its fore end. An auxiliary shaft 38 journaled in spaced bearings 39 on the fore angle irons 18—18', carries several sheaves 40—41 the latter of which is connected by a belt 42 to a pulley 43 on the power take-off shaft 44 of the engine 12. The other sheave 40 on auxiliary shaft 38 is drivingly connected to the aforementioned sheave 37 by a belt 45. Suitable clutching mechanism is provided between the power take-off and drive shaft of engine 12 in a manner well known in the art to thereby facilitate controlling the operation of the auxiliary shaft 38 from which the rods 22 are caused to reciprocate. Remote control means 46 for effecting operation of the engine 12 are shown at 47—47', their terminal levers being disposed in proximity to the seat 21 at the rear of the frame 15 to facilitate manual operation thereof by a person on the seat. Obviously such control means 46 can be disposed for manual operation by the driver of the tractor, however, since a person at the rear of the frame 15 can best observe the plant thinning action therein, control by the latter person is best.

The plant thinning action of the present invention is accomplished by a plurality of hoe units 50 disposed for movement transversely of each bed of plants by the reciprocating rods 22. Each hoe 50 and its connection to the rods 22 being identical, only one hoe unit will be explained specifically, like reference numerals being applied to like parts excepting where necessary to distinguish the action of one hoe unit relative to the other.

Each hoe unit 50 comprises a shank 51 having at one end a hoe head 52 disposed at a particular angle relative to the shank 51 and transversely thereof for reasons later to be explained. The opposite end of the shank 51 is pivotally connected as at 53 to a depending arm 54, the upper end of which is secured to the reciprocating bars 22 for movement therewith. The manner of connection between the arm 54 and the rods 22 may vary. In the present disclosure I have shown a pair of straps 55 secured by bolts 56 for clamping the bars 22 between them. Thus the straps 55 extend transversely relative to the bars 22. A U-bolt 57, having its bight 58 surrounding the upper end of the arm 54, has its threaded arms 59 embracing the straps 55. A plate 60 having holes aligned to receive the threaded arms 59 of the U-bolt 57 serves to secure the latter and arm 54 firmly against the straps 55 when nuts 62 are tightened onto the threaded arms 59.

From an examination of Figs. 3, 4 and 5, it will be seen that the depending arms 54 upon which the hoe shanks are hung are each centrally located between the parallel transversely disposed reciprocable rods 22. However, the arms 54 are adjustable lengthwise these bars 22 for disposing the hoe head 52 in a proper position relative to the row of plants to be thinned and relative to the stroke of movement of the reciprocable rods by means of the pitman and eccentric.

Since there are two rows of plants in each bed B there are two sets of hoe units 50 provided for each such bed. In this connection, one of such sets of hoes is offset relative to the other by a lateral bend 63 in one of the arms 54' (Fig. 4). In this manner suitable clearance is provided between hoe units 50 for connection with orbital guides for oscillating each hoe unit incident to reciprocation thereof as now to be explained.

The orbital guide or oscillator for each hoe unit 50 comprises a fork like link 65 having its lower forked end 66 provided with a plurality of aligned transverse holes 67, 68 and 69. The hoe shank 51 is disposed between the tines of the forked end 66 for pintle connection 70 therewith at one or the other set of holes 67, 68 or 69 dependent upon the depth of stroke it is desired to have the hoe take. This pintle connection 70 on each hoe shank 51 is substantially midway between the ends of the hoe shank by providing a hole therein through which a pin 72 extends. Thus the hoe shank 51 can be pivotally connected to the fork bar 65 at various distances above the earth to obtain the desired depth of stroke of the hoe blade 52.

The upper end of each fork bar 65 is pivotally connected to a stud shaft 75 so that the fork bar will swing in a plane parallel to the movement of the reciprocable bars 22, i. e., transversely of the frame 15.

In addition to the foregoing pendent or swinging movement of the fork bar 65 there is an eccentric action involved. In other words, the stud shaft 75 extends from a crank arm 76 secured to a driven shaft 77 for rotation therewith. The shaft 77 is journaled for rotation about an axis disposed at a level above the reciprocable rods 22 and in a direction transverse thereto.

It should here be noted that there are four independent shafts 77 shown in the present disclosure, one for each hoe unit 50 of the apparatus. This is best illustrated in Figs. 1 and 2 of the drawings wherein it will be seen that in each set of hoe units 50 (over one double bed B) the foremost hoe unit is associated with a forwardly extending shaft 77F whereas the rearmost hoe unit is associated with a rearwardly extending shaft 77R. Moreover, these forward and rearward shafts 77F and 77R, respectively, of either set thereof rotate in opposite directions relative to each other as indicated by the arrows in Fig. 2. In other words, as one hoe 52 is being depressed by its fork 65, the other hoe of the same set is being raised by its fork 65.

The foregoing alternate-opposite raising and/or lowering of hoes in each set is effected by the reversed rotation of the shafts 77F and 77R in each set. In this connection each shaft 77 (F and R) carries a sprocket 78 connected by a chain 79 to an intermediate sprocket 80. The sprocket 80 is secured to a countershaft 81 disposed centrally of the frame 15 and is journaled for rotation in suitable bearings 82. The countershaft 81, in turn, is connected by the foremost chain 79F to a sprocket 83 secured to the aforementioned drive shaft 34 for the rod reciprocating pitman and eccentric 31—33. The mode of accomplishing reverse rotation between front and rear shafts 77F and 77R is best illustrated in Fig. 2. It will be seen that the chain 79 runs under the intermediate sprocket 80 on the rearward end of the countershaft 81, see also Fig. 1, whereas the chain 79F is trained over the intermediate sprocket 80 on the forward end of the countershaft 81.

Since the countershaft 81 is driven directly from the drive shaft 34 by which the eccentric 33 and pitman 31 effect reciprocation of the twin rods 22, it will be apparent that the up and down movement of the hoe arms 51 by means of the forks 65 is in timed relation with the transverse movement of the hoe arms 51 by means of the reciprocating rods 22. Consequently, the forward shafts 77F rotate in one direction to depress their respective fork arms 65 as the hoe arms associated therewith are thrust hoeward while the rearward shafts 77R rotate in an opposite direction to raise their fork arms 65 and the hoe arms associated therewith during withdrawal or return strokes of the latter in an anti-hoeward direction by the reciprocating rods 22. In other words, the action of each hoe 50 during the foregoing cycle of operation is such that upon each hoeward thrust of the hoe shank 51, the eccentric arm 76 associated therewith is moving in a downward direction in its orbit of movement. Conversely, upon anti-hoeward withdrawal of the hoe shank 51, the eccentric arm 76 is moving upwardly in its orbit. Therefore, as is illustrated in Fig. 3, the hoe head 52 travels in an elliptical path e into the earth, transversely of the row of plants, then upwardly and over the row. The elliptical path e is substantially the same as though a short handled hoe were being wielded by a man standing in the trench T adjacent the row being worked upon, see for example the illustration in Fig. 7, and compare with that of the right hand hoe 50 as seen in Fig. 3.

In connection with the foregoing comparison it should be noted that the spade or head portion 52 of the hoe 50 is disposed in a plane similar to that assumed by a hand operated hoe. In other words, the head portion 52 of the hoe is in a plane diagonally of the long axis of the hoe shank 51, the bottom edge 85 of the hoe head foremost and the top edge 86 thereof partially overlying the neck portion 87 of the hoe shank 51.

From Fig. 3 it will be seen that a pair of hoe units 50 overlie each double bed B and since the frame 15 straddles two double beds there are four hoe units 50 on the reciprocable rods 22 of the apparatus 10. Moreover, the offsetting of the foremost set of hoe units in each pair thereof effects a removal of plants at staggered positions in the two rows of plants in each bed as seen at the left in Fig. 2 (to the rear of the apparatus).

As the apparatus 10 is drawn over the beds B, one hoe unit of each set is in operation, i.e., thinning plants, while the other hoe unit of the pair is in the return phase of its orbit of movement. It should also be noted that upon each thrust of a hoe head into the bed B, the frame 15 is adequately stabilized against lateral shifting due to the fact that the runner 17 of each skid or traction support 16 is embedded in the earth at the base of the trench T. Note also that the runner 17 has a keel 88 which becomes embedded in the earth to maintain the runner in alignment with the center of the trench T.

In addition to the stabilizing effect afforded by the keel 88 on runners 17 it should be noted that the skids 16 function to maintain the hoe heads 52 at a proper level relative to the beds B and the plants therein. In other words, unlike carriages having wheel support, the skid type frame 15 of the present invention bridges any depressions in the trenches or cuts through any mounds or acclivities therein. Consequently, the reciprocating rods 22 are maintained at a uniform and desired distance above the beds of plants so that each hoe digs into earth at the depth desired to effect removal of the plants at the places intended.

In addition to the transverse stroke of each hoe across the row of seedling plants, it should be understood that the frame 15 is being drawn forwardly along the rows and relative to the plants therein. As a result of this combined relative forward movement and transverse stroke, the gap between plants after thinning is appreciably greater than the width of the hoe blade shown. Moreover, any change of speed between the relative speed at which the rods are reciprocating with respect to the forward progress of the apparatus will effect variations in the spacing between plants after thinning. This variations of spacing is controlled by the person on the seat 21 by manipulation of the levers of the remote control means 46 to the engine 12.

The operation of each pair of hoe units 50 in sequence is an easy but positive slicing action similar to that of a manual hoeing action as distinguished from a choppng stroke. Accordingly, a minimum of earth is thrown up during the action of the hoe units 50 and consequently the plants remaining are not disturbed or shunted due to the thinning operation.

Having thus described my invention in specific detail it should be apparent to those skilled in the art that variations, alterations and/or modifications in structure can be made without departing from the spirit of my invention. We, therefore, desire to avail ourselves of all variations, alterations and/or modifications as fairly come within the scope of the appended claims.

What we claim as new and desire to protect by Letters Patent is:

1. In a plant thinning apparatus including a skid type carriage having runners spaced from each other to glide in the trenches between rows of crops for stabilizing said carriage in straddled condition over the rows of crops for uniform horizontal movement relative to plants in said rows of crops; a plant thinning hoe mechanism comprising a reciprocable rod supported on said carriage for reciprocation transversely of the rows of crops, drive means on said carriage operatively connected to said rod for reciprocating the same, a hoe unit including a hoe shank having a hoe head at one end, means for pivotally connecting the opposite end of said hoe shank to said reciprocable rod for transverse reciprocation therewith, a drive shaft journaled for rotation about an axis transverse to said reciprocable rod, a crank arm on said drive shaft having a stud shaft eccentric thereto, a link having one end pivotally connected to said stud shaft and its opposite end pivotally connected to said hoe shank substantially midway its ends for supporting the latter in a plane for reciprocation hoeward and anti-hoeward below said reciprocable rod, and means operatively driving said drive shaft in synchronism with said reciprocable rod for elevating said hoe shank during anti-hoeward movement of said reciprocable rod and for depressing said hoe shank during hoeward movement of said reciprocable rod for effecting a direct thrust of said hoe shank hoe head first into earth to slice out plants in said rows thereof incident to gliding movement of said skid type carriage along said rows of crops.

2. In a plant thinning apparatus including a skid type carriage having runners spaced from each other to glide in the trenches between rows of crops for stabilizing said carriage in straddled condition over the rows of crops for uniform horizontal movement relative to plants in said rows of crops; a plant thinning hoe mechanism comprising a reciprocable rod supported on said carriage for reciprocation transversely of the rows of crops, drive means on said carriage operatively connected to said rod for reciprocating the same, a hoe unit including a hoe shank having a hoe head at one end, means for pivotally connecting the opposite end of said hoe shank to said reciprocable rod for transverse reciprocation therewith, a drive shaft journaled for rotation about an axis transverse to said reciprocable rod, a crank arm on said drive shaft having a stud shaft eccentric thereto, a link having one end pivotally connected to said stud shaft and its opposite end pivotally connected to said hoe shank substantially midway its ends for supporting the latter in a plane for reciprocation hoeward and anti-hoeward below said reciprocable rod, and means operatively connected to said drive means for turning said drive shaft in timed relation with said reciprocable rod whereby said eccentric stud effects a lifting of said hoe shank during anti-hoeward movement of said reciprocable rod and a depressing of said hoe shank during hoeward movement of said reciprocable rod for exerting a direct thrust of said hoe head into earth to slice out plants in said rows thereof incident to gliding movement of said skid type carriage along said rows of crops.

3. In a plant thinning device including a skid type carriage having runners spaced from each other to glide in the trenches between rows of crops for stabilizing said carriage in straddled condition over the rows of crops for uniform horizontal movement relative to plants in said rows of crops; a plant thinning apparatus comprising a reciprocable rod supported on said carriage for reciprocation transversely of the rows of crops, drive means on said carriage operatively connected to said rod for reciprocating the same, a hoe unit including a hoe shank having a hoe head at one end, means for pivotally connecting the opposite end of said hoe shank to said reciprocable rod for transverse reciprocation therewith, a drive shaft journaled for rotation about an axis transverse to said reciprocable rod, a crank arm on said shaft in a plane coincident to the axis of said reciprocable rod having a stud shaft eccentric thereto, a link having one end pivotally connected to said stud shaft and its opposite end pivotally connected to said hoe shank substantially midway its ends for supporting the latter in said plane for reciprocation hoeward and anti-hoeward below said reciprocable rod, and means operatively connected to said drive means for turning said drive shaft in synchronism with said reciprocable rod for elevating said hoe shank during anti-hoeward movement of said reciprocable rod and for depressing said hoe shank during hoeward movement of said reciprocable rod for effecting movement of said hoe head through an elliptical orbit and a direct thrust of said hoe head into earth during hoeward movement of said rod to slice plants from said earth incident to gliding movement of said skid type carriage along said rows of crops.

4. In a plant thinning apparatus including a skid type carriage having runners spaced from each other to glide in the trenches between rows of crops for stabilizing said carriage in straddled condition over the rows of crops for uniform horizontal movement relative to plants in said rows of crops; a plant thinning hoe arrangement comprising a reciprocable rod supported on said carriage for reciprocation transversely of the rows of crops, drive means on said carriage operatively connected to said rod for reciprocating the same, a hoe unit including a hoe shank having a hoe head at one end, means for pivotally connecting the opposite end of said hoe shank to said reciprocable rod for transverse reciprocation therewith, a drive shaft journaled for rotation about an axis transverse to said reciprocable rod, a crank arm on said shaft having a stud shaft eccentric thereto, a link having one end pivotally connected to said stud shaft, the opposite end of said link being forked to receive said hoe shank substantially midway its ends, said hoe shank having a plurality of pin receiving holes spaced from each other lengthwise of said shank, means for optionally and pivotally connecting the forked end of said link in one of said pin receiving holes for supporting the said hoe head at a desired depth of cut during reciprocation of said rod in a hoeward direction, and means operatively connecting said drive shaft to said drive means for elevating the hoe head on said hoe shank during anti-hoeward movement of said reciprocable rod and for depressing said hoe head during hoeward movement of said reciprocable rod for effecting a direct thrust of said hoe shank hoe head first into earth to slice out plants in said rows thereof incident to gliding movement of said skid type carriage along said rows of crops.

References Cited in the file of this patent

UNITED STATES PATENTS

| | | |
|---|---|---|
| 950,966 | Snow | Mar. 1, 1910 |
| 1,164,039 | Von Post | Dec. 14, 1915 |
| 1,214,684 | Jones | Feb. 6, 1917 |
| 1,368,177 | Magistro | Feb. 8, 1921 |
| 1,370,078 | Wilson | Mar. 1, 1921 |
| 1,569,070 | Cain | Jan. 12, 1926 |
| 1,755,861 | Becerra | Apr. 22, 1930 |
| 2,043,076 | Smith | June 2, 1936 |
| 2,260,685 | Schmitz et al. | Oct. 28, 1941 |

FOREIGN PATENTS

| | | |
|---|---|---|
| 2,391 | Great Britain | of 1867 |
| 2,230 | Great Britain | of 1873 |